(12) United States Patent
Beacom et al.

(10) Patent No.: US 6,233,943 B1
(45) Date of Patent: May 22, 2001

(54) COMPUTERIZED SYSTEM AND METHOD FOR SYNCHRONIZING ENGINE SPEED OF A PLURALITY OF INTERNAL COMBUSTION ENGINES

(75) Inventors: William Frederick Beacom, Jupiter; Arthur Gray Manchester, Stuart, both of FL (US)

(73) Assignee: Outboard Marine Corporation, Waukegan, IL (US)

( * ) Notice: Subject to any disclaimer, the term of this patent is extended or adjusted under 35 U.S.C. 154(b) by 0 days.

(21) Appl. No.: 09/672,137

(22) Filed: Sep. 27, 2000

(51) Int. Cl.$^7$ ..................................... F01B 21/04
(52) U.S. Cl. ............................... 60/706; 60/719
(58) Field of Search .............................. 60/706, 710, 719

(56) References Cited

U.S. PATENT DOCUMENTS

| | | |
|---|---|---|
| 2,466,282 * | 4/1949 | Sparrow et al. .................... 60/710 X |
| 2,740,260 * | 4/1956 | Blanchard .............................. 60/710 |
| 3,986,363 | 10/1976 | Beaman et al. . |
| 4,412,422 * | 11/1983 | Rossi .................... 60/719 X |
| 4,622,938 | 11/1986 | Wenstadt et al. . |
| 4,646,696 | 3/1987 | Dogadko . |
| 4,648,497 | 3/1987 | Prince . |
| 4,747,381 | 5/1988 | Baltz et al. . |
| 4,755,156 | 7/1988 | Wagner . |
| 4,788,955 | 12/1988 | Wood . |
| 4,805,396 | 2/1989 | Veerhusen . |
| 4,809,506 * | 3/1989 | Lauritsen ............... 60/710 |
| 4,858,585 | 8/1989 | Remmers . |
| 4,964,276 | 10/1990 | Sturdy . |
| 5,004,962 | 4/1991 | Fonss et al. . |
| 5,062,403 | 11/1991 | Brekenfeld et al. . |
| 5,062,516 | 11/1991 | Prince . |
| 5,065,723 | 11/1991 | Broughton et al. . |
| 5,273,016 | 12/1993 | Gillespie et al. . |
| 5,730,105 | 3/1998 | McGinnity . |
| 5,771,860 | 6/1998 | Bernardi . |
| 6,073,592 | 6/2000 | Brown et al. . |

* cited by examiner

Primary Examiner—Hoang Nguyen
(74) Attorney, Agent, or Firm—Enrique J. Mora; Robert W. Duckworth; Holland & Knight LLP

(57) ABSTRACT

Computerized system and method for controlling a plurality of internal combustion engines are provided. The system includes a respective speed sensor coupled to a corresponding engine to supply a respective speed sensor signal indicative of each engine's speed. The system further includes an electronic control unit coupled to receive each respective speed sensor signal. The control unit in turn includes a comparator module configured to compare each speed sensor signal relative to one another and supply a comparator output signal based on the magnitude of any differences between the engine speed signals. A processor module is responsive to the comparator output signal to adjust one or more engine operational parameters of one or more of the plurality of engines. The one or more engine operational parameters are responsive to respective control signals from the control unit to affect engine speed to reduce the magnitude of the engine speed differences so as to maintain each engine speed within a predefined range from one another.

19 Claims, 3 Drawing Sheets

COMPUTERIZED SYSTEM AND METHOD FOR SYNCHRONIZING ENGINE SPEED OF A PLURALITY OF INTERNAL COMBUSTION ENGINES

BACKGROUND OF THE INVENTION

The present invention is generally related to control of internal combustion engines, and, more particularly, the present invention is related to system and method for synchronizing engine speed in boats equipped with multiple engines.

Reciprocating internal combustion engines may create high acoustical noise and vibration during operation. Particularly in the case of vessels equipped with paired engines as their primary propulsion device, it is desirable to run such vessels with each engine operating synchronized relative to one another, that is, each engine should operate at the same or nearly the same speed. Lack of engine synchronization may cause annoying beat frequencies that would result in annoying discomfort to the occupants of the vessel. Under some known techniques, the engine synchronization may be attempted by manual adjustment of the throttle levers at the helm of the vessel. At best such techniques may only be partly effective since they may require human intervention, such as helmsman's observation of engine speed meters, e.g., tachometers, in conjunction with manual adjustment of the throttle levers. Under such techniques, the occupants of a multi-engine vessel with engines running at cruising speeds are often subjected to unpleasant noise and transmission and/or engine vibration when the respective speed or revolutions per minute (rpm) of the two or more propulsion engines are not held very close to one another, that is, when the engines are not synchronized.

As will be understood by those skilled in the art, most modern relatively large marine engines for pleasure boats and other marine vessels may be operated from a helm station using remote engine controls with throttle and shift engine control inputs conveyed to the engine by mechanical push-pull cables. Unfortunately, even relatively minor variations in control mechanisms, control cables, control cable routing, and engine throttle control linkages, and the adjustments thereof can collectively result in substantial differences in mechanical efficiency between the remote control lever and the engine's input signal device. Thus, in the case of known automated synchronizers, since these synchronizers generally rely on mechanically adjusting the respective throttle levers and throttle valves and associated cabling, these automated synchronizers tend to be expensive and unaffordable in small boat applications and subject to the above-described difficulties of having to provide mechanical control to a relatively inaccurate system. Engine control may be further complicated by routine engine operations, such as rotation of the engine about its steering axis or tilting (trimming) of the engine about its tilt axis, which operations can also affect mechanical throttle input to the engine's input signal device.

In view of the foregoing issues, it should be appreciated that remote control of throttle lever position by controlling lever or handle position relative to the other, either manually or automatically, can become unwieldy since such levers may become substantially offset relative to one another or have unpredictable relative position and often do not provide equal throttle control input and fail to provide appropriate engine synchronization even though the levers may be physically adjacent to one another. Thus, it is desirable to overcome the disadvantages of presently available remote engine control systems and to accurately synchronize engine speeds by utilizing microprocessor-based system and techniques to compare engine speeds and adjust engine power output electronically, thus achieving accurate and reliable engine synchronization by electronically controlling engine power independent of the respective primary throttle control input signal supplied to each engine.

SUMMARY OF THE INVENTION

Generally speaking, the foregoing needs are fulfilled by providing in one aspect of the present invention a computerized system for controlling a plurality of internal combustion engines. The system comprises a respective speed sensor coupled to a corresponding engine to supply a respective speed sensor signal indicative of each engine's speed. The system further comprises an electronic control unit coupled to receive each respective speed sensor signal. The control unit in turn comprises a comparator module configured to compare each speed sensor signal relative to one another and supply a comparator output signal based on the magnitude of any differences between the engine speed signals. A processor module is responsive to the comparator output signal to adjust one or more engine operational parameters of one or more of the plurality of engines. The one or more engine operational parameters are responsive to respective control signals from the control unit to affect engine speed to reduce the magnitude of the engine speed differences so as to maintain each engine speed within a predefined range from one another.

The present invention further fulfills the foregoing needs by providing in another aspect thereof a computer-readable medium encoded with computer program code for controlling a plurality of marine internal combustion engines. Each engine has a corresponding speed sensor coupled to supply a respective speed sensor signal indicative of each engine's speed. The program code causing a computer to execute a method that allows for comparing each speed sensor signal relative to one another to supply a signal based on the magnitude of any differences therebetween. The method further allows for processing the signal based on the magnitude of the engine speed differences to adjust one or more engine operational parameters of one or more of the plurality of engines. A generating step allows for generating respective control signals to cause the one or more engine operational parameters to affect engine speed of one or more of the plurality of engines so as to maintain each engine speed within a predefined range from one another.

Figure 1:
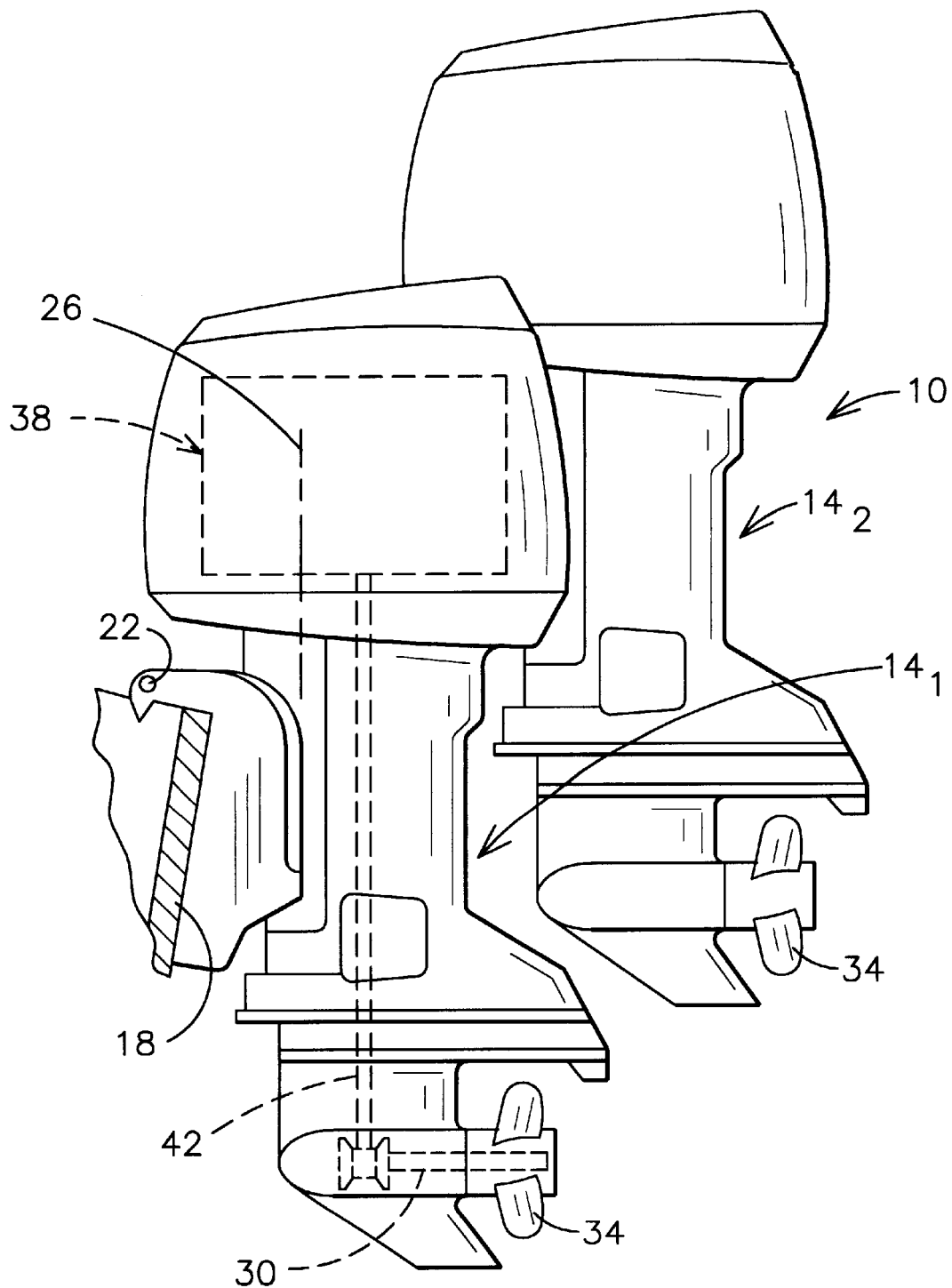
FIG. 1 is a side view of an exemplary multi-engine marine propulsion device that may benefit from the present invention.

Before any embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE INVENTION

An exemplary multi-engine marine propulsion device 10 that may benefit from the engine synchronization techniques of the present invention is illustrated in FIG. 1. The marine propulsion device 10 includes a dual outboard drive unit $14_1$ and $14_2$ adapted to be mounted to the transom 18 of a boat for pivotal tilting movement relative thereto about a generally horizontal tilt axis 22 and for pivotal steering movement relative thereto about a generally vertical steering axis 26. Each drive unit $14_1$ and $14_2$ includes a propeller shaft 30 having a propeller 34 fixed thereto. In one exemplary embodiment, each drive unit $14_1$ and $14_2$ also includes a direct fuel-injected, two-stroke internal combustion engine 38 drivingly connected to the propeller shaft 30 by a standard drive train 42. Engine 38 may be a six-cylinder V-type engine. It should be understood, however, that the invention is applicable to other types of engines with any number of cylinders. It should be further understood that the present invention need not be limited to outboard drives since other types of marine propulsion devices, such as stem drives, could also benefit from the present invention.

Figure 2:
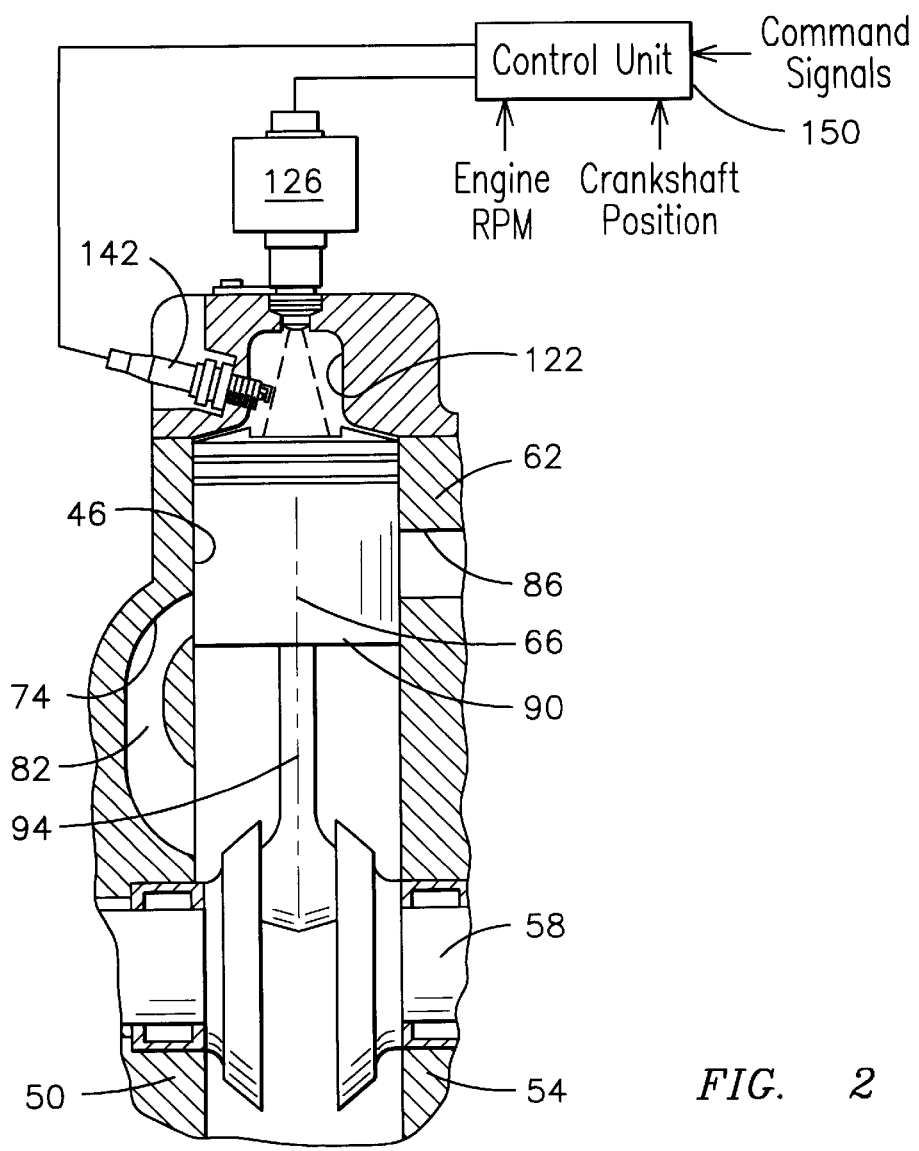
FIG. 2 is a schematic representation of an exemplary cylinder and associated components including an electronic control unit embodying one aspect of the present invention.

FIG. 2 illustrates an exemplary construction of a multi-cylinder engine embodying the present invention. For the sake of clarity and brevity only one cylinder 46 of the multi-engine device is illustrated in FIG. 2. The engine includes a crankcase 50 defining a crankcase chamber 54 and having a crankshaft 58 rotatable therein. An engine block 62 defines the cylinder 46, which has a longitudinal axis 66 and an upper end (the upper end in FIG. 2). The engine block 62 also defines respective intake ports communicating with the cylinder 46. Each of the ports communicates with the crankcase chamber 54 via a respective transfer passage 82 (one shown in FIG. 2). The engine block 62 also defines an exhaust port 86 which communicates with the cylinder 46 and which may be located diametrically opposite one of the intake ports.

The engine also includes a piston 90 having a generally cylindrical body reciprocally moveable in the cylinder 46 along the axis 66. The piston 90 is drivingly connected to the crankshaft 58 by a connecting rod 94. The engine also includes a cylinder head 110 including a lower surface portion 114 closing the upper end of the cylinder 46 so as to define a combustion chamber 118 between the piston upper surface 98 and the cylinder head lower surface portion 114. When the piston 90 is at top dead center, the piston upper surface 98 is spaced a predetermined distance from the cylinder head lower surface portion 114. The cylinder head lower surface portion 114 extends generally perpendicular to the cylinder axis 66 and has therein an upwardly extending recess or dome 122. The cylinder head lower surface portion 114 surrounding the recess 122 is concave and is complementary with the piston upper surface 98. It will be appreciated by those skilled in the art that in general recess 122 need not be centered on the cylinder axis. For example, the recess could be configured as an asymmetrical recess relative to the cylinder axis, provided the squish area and the volume defined by such non-symmetrical recess remain the same relative to the corresponding parameters of the symmetrical recess.

The engine also includes a fuel injector 126 mounted on the cylinder head 110 for injecting fuel into the upper end of the recess 122. The fuel injector 126 creates a cone 130 of fuel spray surrounded by a volume of fuel vapor, the cone 130 being centered on the cylinder axis 66. The engine 38 also includes a spark plug 142 which is mounted on the cylinder head 110 and which extends into the recess 122. In the illustrated construction, the spark plug 142 extends along a plug axis 146 which is located in the plane of the cone axis 134. Also, the spark plug 142 is located directly above the intake port 74. The spark plug 142 includes a spark gap 150 located outside the fuel spray cone 130 and within the fuel vapor volume, so that the spark plug 142 initially ignites fuel vapor rather than directly igniting the fuel spray. Ignition is timed so that the spark plug 142 ignites the fuel spray before the fuel spray strikes the piston upper surface 98. The engine also includes a source of fuel, i.e. a fuel tank, and a fuel supply system (not shown) for supplying fuel to the various fuel injectors of each engine. The fuel supply system may include a fuel pump communicating between the fuel tank and the fuel injectors in fashion well-understood by those skilled in the art.

It will be appreciated by those skilled in the art that the fuel injector described above is one example of a type of injector commonly referred to as single fluid, direct fuel injection delivery. Another type of injector uses a high pressure pump for pressurizing a high pressure line to deliver fuel to the fuel injector through a fuel rail that delivers fuel to each injector. A pressure control valve may be coupled at one end of the fuel rail to regulate the level of pressure of the fuel supplied to the injectors to maintain a substantially constant pressure thereat. The pressure may be maintained by dumping excess fuel back to the vapor separator through a suitable return line. The fuel rail may incorporate nipples that allow the fuel injectors to receive fuel from the fuel rail. Thus, in this case, it is believed that a substantially steady pressure differential—as opposed to a pressure surge—between the fuel rail and the nipples causes the fuel to be injected into the fuel chamber. Another example of direct fuel injection is a dual-fluid injection system that could be used include those that include a compressor or other compressing means configured to provide the source of gas under pressure to effect injection of the fuel to the engine, that is, fuel injectors that deliver a metered individual quantity of fuel entrained in a gas. It is to be understood, however, that the present invention is not limited to any particular type of direct fuel injector.

As will be described below, an electronic control unit 150 generates one or more electronic control signals respectively supplied to each injector, spark plug and other components of the fuel injection system so as to adjust one or more engine parameters able to influence engine speed. The engine parameters may include by way of example and not of limitation, fuel value, i.e., amount of fuel delivered per unit of time, timing of fuel injection relative to crankshaft position, duration of fuel injection, and timing of ignition relative to crankshaft position. It will be appreciated that crankshaft position may be determined by any standard crankshaft position sensor coupled to supply a signal indicative of crankshaft position in fashion well-understood by those of ordinary skill in the art. For example, this signal allows for determining the respective cycle each piston/cylinder is actually in, that is, it allows for quantifying relative positioning of each piston as each piston reciprocates between top and bottom dead center positions. Thus, by electronically adjusting the values of one or more of such engine operational parameters in at least one of the engines one may reduce the magnitude of any engine speed differences and maintain each engine speed within a predefined range from one another. For example, if one engine is running at 1010 RPM and the other engine is running at 990 RPM, and assuming the predefined range is plus/minus 5 RPM, then in one exemplary control strategy one could pick 1000 RPM as the desired common running speed and so long as either engine is within the range from 995 to 1005 RPM, then such engine speeds will be considered to be synchronized relative to one another. Thus, in this example the engine speed on one engine would be increased to at least 995 RPM and the other engine speed would be lowered to at least 1005 RPM. It is believed that it may be somewhat easier to use a control strategy wherein the engine with the faster engine speed is lowered relative to the engine running at the lower engine speed. It will be appreciated, however, that the present invention need not limited to that control strategy since one could have picked 990 RPM or 1010 RPM as the desired common engine speed and in either of these cases one would adjust the operational parameters of one of the engines to be within the predefined range relative to the picked common engine speed.

Figure 3:
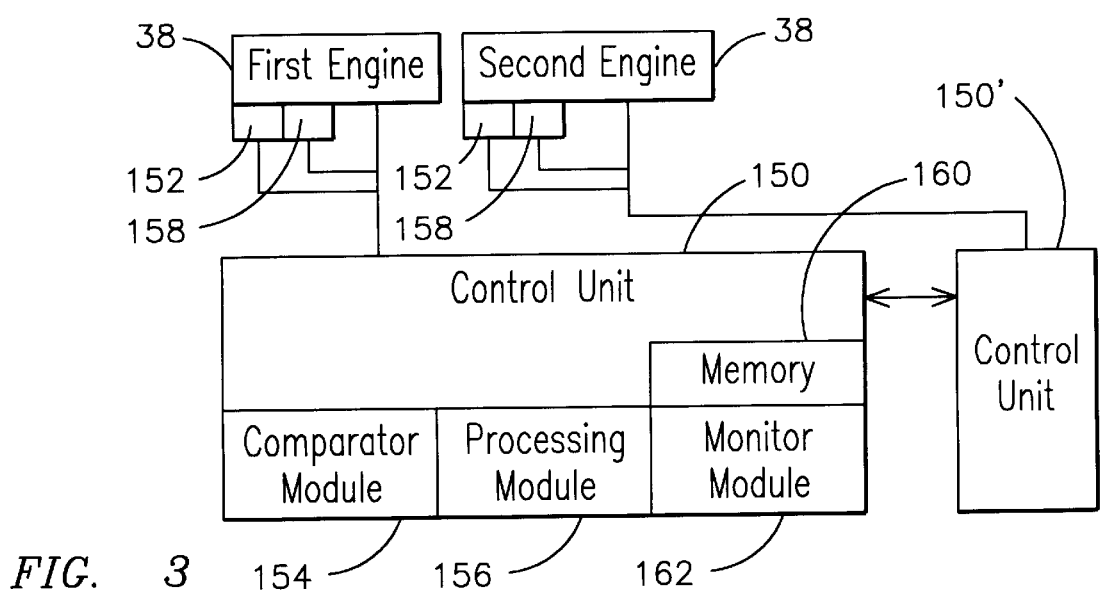
FIG. 3 is a block diagram illustrating further details regarding the electronic control unit shown in FIG. 2.

FIG. 3 illustrates an exemplary block diagram of a computerized system for controlling a plurality of internal combustion engines. A respective speed sensor 152 is coupled to a corresponding engine to supply a respective speed sensor signal indicative of each engine's speed. As shown in FIG. 3, electronic control units 150 and 150' are respectively coupled to receive a respective speed sensor signal. It will be appreciated that the present invention need not be implemented in two separate control units since the functional and operational interrelationship provided by them could be readily integrated in an integrated control unit.

For the sake of simplicity of illustration, the respective modular components for unit 150' are not duplicated in FIG. 3, however, each electronic unit may comprise a comparator module 154 configured to compare each speed sensor signal relative to one another and supply a comparator output signal based on the magnitude of any engine speed differences. A processor module 156 is responsive to the comparator output signal to adjust one or more of the engine operational parameters of one or more of the engines. As suggested above, the engine operational parameters are responsive to control signals generated by the control unit to affect (increase, decrease or neither) engine speed to reduce the magnitude of the engine speed differences in order to maintain each engine speed within a predefined range from one another. As further shown in FIG. 3, a camshaft position sensor 158 is coupled to supply a signal indicative of crankshaft position to the control unit. The signal from sensor 158 may be used for determining timing of fuel injection relative to crankshaft position, and timing of ignition relative to crankshaft position. Memory 162 may be used for storing any specific engine speed synchronization rules that may be used by processing module 156 to generate the control signals applied to the fuel injectors and spark plugs. As suggested above, the rules may allow for selecting whether one or both of the engines would be adjusted to reach a desired common speed, or whether one of the engines would be chosen as a reference engine speed. Control unit 150 may further include a monitoring module 162 to monitor whether each of the plurality of engines has reached a steady state mode of operation so as to maintain each engine speed within the predefined range during the steady state mode of operation. For example, the monitor module may monitor each speed sensor signal to determine whether the engine has reached a minimum operating speed, or determine whether any of the engines is undergoing a rapid rate of speed changes, such as when the boat is commanded to accelerate. It will be appreciated that during transient periods when engine speed is undergoing rapid changes, then applying the foregoing engine speed synchronization may not be desirable. Thus, monitoring module 162 allows for preventing processor module 156 from driving each engine speed to be within the predefined range when not in the steady state mode of operation. It will be appreciated that an operator activated discrete signal may be similarly used for overriding engine speed synchronization in case the operator desires to deactivate such feature from the electronic control unit. In another advantageous aspect of the present invention, it should be appreciated that the present invention conveniently makes use of components generally available in typical boats. For example, components such as engine speed sensors, the crankshaft position sensor, and the engine control unit signal are commonly available in computer-controlled fuel injected engines. The various modules described above may comprise software modules stored in memory of the engine control unit. Thus, the present invention can be retrofitted at a relatively low cost in already deployed boats or may be implemented in new boats without having to make any substantial hardware changes to existing engine control systems.

Figure 4:
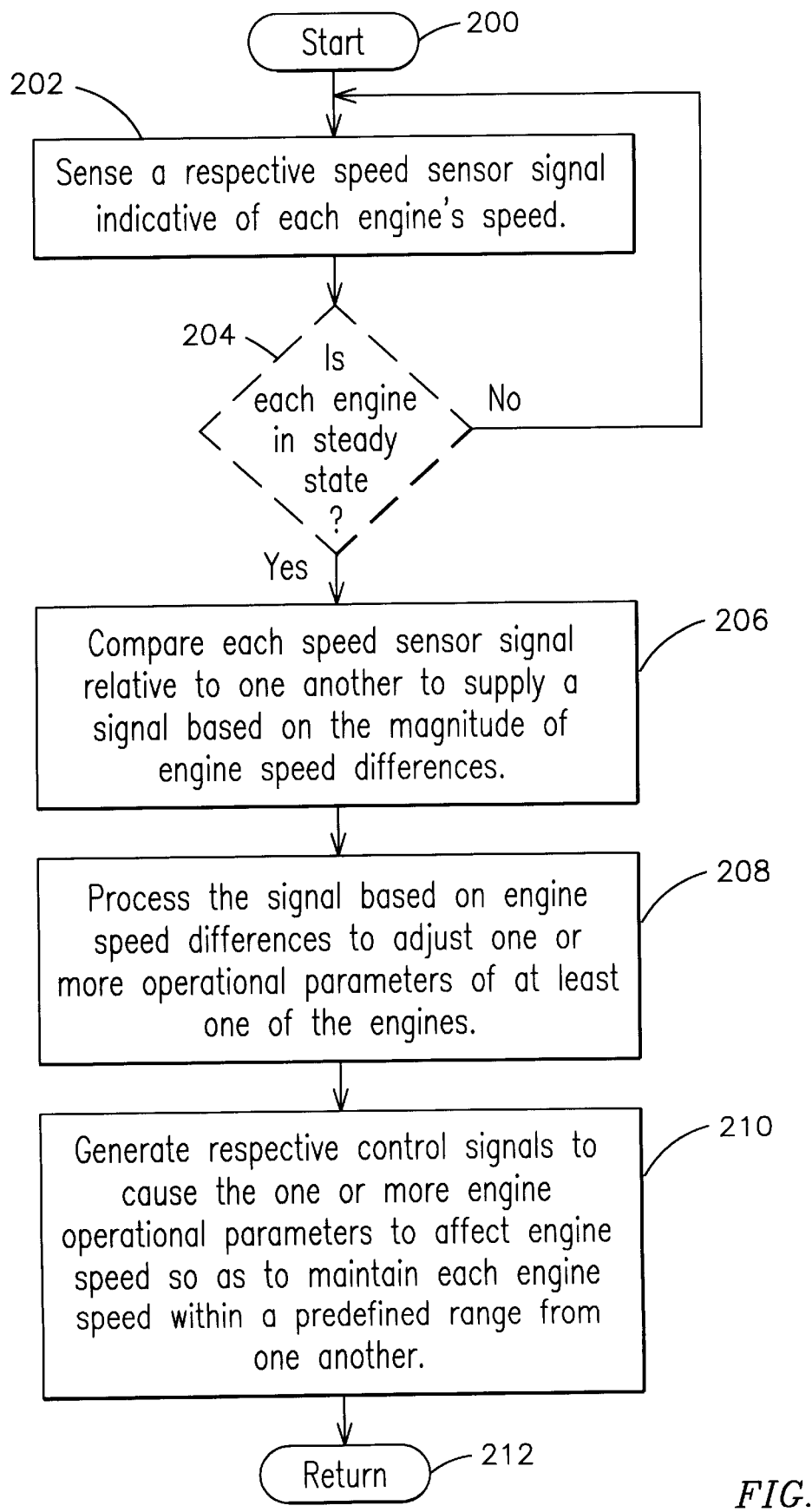
FIG. 4 is a flow chart illustrating exemplary steps that may be executed with the electronic control unit of FIGS. 2 and 3.

FIG. 4 is a flow chart of an exemplary method for synchronizing engine speed of multiple engines relative to one another. Subsequent to start step 200, step 202 allows for sensing a respective speed sensor signal indicative of each engine's speed. If desired, optional step 204 may be used for monitoring whether each engine is in steady state or not. If any of the engines is not in steady state operation, then one may return to speed sensing step 202, until steady state operation has been reached. If each engine is in steady state, step 206 allows for comparing each speed sensor signal to one another to supply a signal based on the magnitude of any engine speed differences. Step 208 allows for processing the signal based on engine speed differences to adjust one or more operational parameters of one or more of the engines. Prior to return step 212, step 210 allows for generating respective control signals that cause one or more of the engine operational parameters to affect engines speed so as to maintain each engine speed within the predefined range.

The present invention can be embodied in the form of computer-implemented processes and apparatus for practicing those processes. The present invention can also be embodied in the form of computer program code containing computer-readable instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose computer, the computer program code segments configure the computer to create specific logic circuits or processing modules.

It will be understood that the specific embodiment of the invention shown and described herein is exemplary only. Numerous variations, changes, substitutions and equivalents will now occur to those skilled in the art without departing from the spirit and scope of the present invention.

Accordingly, it is intended that all subject matter described herein and shown in the accompanying drawings be regarded as illustrative only and not in a limiting sense and that the scope of the invention be solely determined by the appended claims.

What is claimed is:

1. Computerized system for controlling a plurality of internal combustion engines, the system comprising:

a respective speed sensor coupled to a corresponding engine to supply a respective speed sensor signal indicative of each engine's speed;

an electronic control unit coupled to receive each respective speed sensor signal, said control unit comprising:

a comparator module configured to compare each speed sensor signal relative to one another and supply a comparator output signal based on the magnitude of any differences therebetween;

a processor module responsive to the comparator output signal to adjust one or more engine operational parameters of one or more of the plurality of engines, the one or more engine operational parameters being responsive to respective control signals from the control unit to affect engine speed to reduce the magnitude of said engine speed differences so as to maintain each engine speed within a predefined range from one another.

2. The computerized system of claim 1 wherein each engine comprises a plurality of cylinders, each cylinder being configured to receive a corresponding piston drivingly connected to a crankshaft, each engine further comprising a plurality of fuel injectors, each fuel injector being coupled to directly supply fuel to each respective cylinder in response to one or more of the control signals from the electronic control module.

3. The computerized system of claim 2 wherein each cylinder receives a spark plug responsive to one of the control signals from the electronic control module to ignite fuel delivered by the corresponding fuel injector.

4. The computerized system of claim 3 further comprising a camshaft position sensor coupled to supply a signal indicative of camshaft position to the control unit.

5. The computerized system of claim 4 wherein said operational parameters are selected from the group consisting of fuel value, timing of fuel injection relative to crankshaft position, duration of fuel injection, and timing of ignition relative to crankshaft position.

6. The computerized system of claim 1 wherein the engine comprises a two-cycle marine engine.

7. The computerized system of claim 1 wherein the electronic control unit further comprises a monitoring module configured to monitor whether each of the plurality of engines has reached a steady state mode of operation so as to maintain each engine speed within the predefined range during said steady state mode of operation.

8. The computerized system of claim 7 wherein said monitoring module is further configured to prevent the processor module from forcing each engine speed to be within the predefined range when outside said steady state mode of operation.

9. A computer-readable medium encoded with computer program code for controlling a plurality of marine internal combustion engines, each engine having a corresponding speed sensor coupled to supply a respective speed sensor signal indicative of each engine's speed, the program code causing a computer to execute a method comprising:

comparing each speed sensor signal relative to one another to supply a signal based on the magnitude of any differences therebetween;

processing the signal based on the magnitude of the engine speed differences to adjust one or more engine operational parameters of one or more of the plurality of engines; and generating respective control signals to cause the one or more engine operational parameters to affect engine speed of one or more of the plurality of engines so as to maintain each engine speed within a predefined range from one another.

10. The computer-readable medium of claim 9 wherein each engine comprises a plurality of cylinders, each cylinder being configured to receive a corresponding piston drivingly connected to a crankshaft, each engine further comprising a plurality of fuel injectors, each fuel injector being coupled to supply fuel to each respective cylinder in response to one or more of the control signals.

11. The computer-readable medium of claim 10 wherein each cylinder receives a spark plug responsive to one of the control signals to ignite fuel delivered by the corresponding fuel injector.

12. The computer-readable medium of claim 11 further comprising sensing a signal indicative of camshaft position.

13. The computer-readable medium of claim 12 wherein said operational parameters are selected from the group consisting of fuel value, timing of fuel injection relative to crankshaft position, duration of fuel injection and timing of ignition relative to crankshaft position.

14. The computer-readable medium of claim 9 wherein the engine comprises a two-cycle direct fuel injection engine.

15. The computer-readable medium of claim 9 further comprising monitoring whether each of the plurality of engines has reached a steady state mode of operation so as to maintain each engine speed within the predefined range during said steady state mode of operation.

16. The computer-readable medium of claim 15 further comprising preventing generation of control signals configured to drive each engine speed to be within the predefined range when outside said steady state mode of operation.

17. A computerized method for synchronizing engine speed of first and second internal combustion engines relative to one another, the method comprising:

sensing a respective speed sensor signal indicative of each engine's speed;

comparing each speed sensor signal relative to one another to supply a signal based on the magnitude of any deviations therebetween;

processing the signal based on engine speed deviations to adjust one or more engine operational parameters of the first engine, the second engine, or both; and generating respective control signals to cause the one or more engine operational parameters to affect engine speed so as to maintain each engine speed within a predefined range from one another; and monitoring whether each of the first and second engines has reached a steady state mode of operation so as to maintain each engine speed within the predefined range during said steady state mode of operation.

18. The computerized method of claim 17 further comprising preventing generation of control signals configured to drive each engine speed to be within the predefined range when outside said steady state mode of operation.

19. The computerized method of claim 17 wherein said operational parameters are selected from the group consisting of fuel value, timing of fuel injection, duration of fuel injection, and timing of ignition.

* * * * *